United States Patent
Horne et al.

(10) Patent No.: US 8,182,563 B2
(45) Date of Patent: May 22, 2012

(54) SEPARATING APPARATUS

(75) Inventors: Lucas Horne, Malmesbury (GB);
Matthew Robert Jupe, Malmesbury (GB); David Colin Worker, Malmesbury (GB); Guillaume Kristian Steadman, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 25 days.

(21) Appl. No.: 12/749,137

(22) Filed: Mar. 29, 2010

(65) Prior Publication Data
US 2010/0242221 A1 Sep. 30, 2010

(30) Foreign Application Priority Data

Mar. 31, 2009 (GB) .................................. 0905500.5
Jul. 24, 2009 (GB) .................................. 0912938.8

(51) Int. Cl.
*B01D 50/00* (2006.01)
(52) U.S. Cl. ................ 55/337; 55/428; 55/429; 55/343; 55/345; 55/482; 55/528; 55/424; 55/426; 55/DIG. 3; 15/347; 15/352; 15/353; 96/15; 96/54; 96/57
(58) Field of Classification Search .................. 55/337, 55/428, 429, 343, 345, 482, 528, 424, 426; 15/347, 352, 353; 96/15, 54, 57
See application file for complete search history.

(56) References Cited

U.S. PATENT DOCUMENTS

| | | | | |
|---|---|---|---|---|
| 2,569,710 A | | 10/1951 | Fitzpatrick | |
| 4,133,653 A | * | 1/1979 | Soltis ................................ | 96/58 |
| 4,309,199 A | | 1/1982 | Suzuki | |
| 4,370,155 A | * | 1/1983 | Armbruster ..................... | 96/140 |
| 4,507,131 A | * | 3/1985 | Fathauer et al. ................. | 96/21 |
| 4,541,847 A | | 9/1985 | Oie et al. | |
| 4,718,923 A | | 1/1988 | Haag et al. | |
| 4,726,825 A | * | 2/1988 | Natale ............................. | 55/318 |
| 4,826,515 A | * | 5/1989 | Dyson ............................. | 55/345 |
| 4,853,011 A | * | 8/1989 | Dyson ............................. | 55/345 |
| 5,143,524 A | | 9/1992 | Inculet et al. | |
| 5,230,722 A | * | 7/1993 | Yonkers ........................... | 55/337 |
| 5,248,323 A | * | 9/1993 | Stevenson ........................ | 95/90 |
| 5,582,632 A | | 12/1996 | Nohr et al. | |
| 5,593,476 A | | 1/1997 | Coppom | |

(Continued)

FOREIGN PATENT DOCUMENTS

CA 714367 7/1965

(Continued)

OTHER PUBLICATIONS

GB Search report mailed on Nov. 12, 2009 directed at application No. 0912938.8; 1 page.

(Continued)

*Primary Examiner* — Jason M Greene
*Assistant Examiner* — Dung H Bui
(74) *Attorney, Agent, or Firm* — Morrison & Foerster LLP

(57) ABSTRACT

The present invention relates to a separating apparatus for separating particles from a fluid flow. Particularly, but not exclusively, the invention relates to a vacuum cleaner having such a separating apparatus for removing dust particles from a dust laden airstream. The separating apparatus includes a first cyclonic cleaning stage, a second cyclonic cleaning stage arranged downstream from the first cyclonic cleaning stage, and an elongate filter arranged downstream from the second cyclonic cleaning stage, wherein the filter is at least partially surrounded by the first cyclonic cleaning stage.

14 Claims, 11 Drawing Sheets

U.S. PATENT DOCUMENTS

| | | | |
|---|---|---|---|
| 5,647,890 A | 7/1997 | Yamamoto | |
| 5,651,811 A * | 7/1997 | Frey et al. | 96/69 |
| 5,755,333 A | 5/1998 | Stencel et al. | |
| 6,197,096 B1 * | 3/2001 | Cartellone | 96/55 |
| 6,245,126 B1 | 6/2001 | Feldman et al. | |
| 6,482,252 B1 | 11/2002 | Conrad et al. | |
| 6,709,495 B1 * | 3/2004 | Storer | 96/58 |
| 7,179,314 B2 * | 2/2007 | Conrad et al. | 55/321 |
| 7,311,747 B2 * | 12/2007 | Adamek et al. | 55/498 |
| 7,507,269 B2 * | 3/2009 | Murphy et al. | 55/337 |
| 7,547,336 B2 * | 6/2009 | Fester et al. | 55/337 |
| 7,556,662 B2 * | 7/2009 | Lee et al. | 55/345 |
| 7,731,769 B2 * | 6/2010 | Min | 55/337 |
| 2002/0134238 A1 | 9/2002 | Conrad et al. | |
| 2003/0037676 A1 | 2/2003 | Dunshee | |
| 2004/0065202 A1 | 4/2004 | Gatchell et al. | |
| 2004/0194250 A1 * | 10/2004 | Conrad et al. | 15/353 |
| 2005/0028675 A1 * | 2/2005 | Conrad et al. | 96/57 |
| 2005/0050678 A1 | 3/2005 | Oh et al. | |
| 2005/0087080 A1 | 4/2005 | Yoshida et al. | |
| 2005/0091786 A1 * | 5/2005 | Wright et al. | 15/353 |
| 2005/0125939 A1 | 6/2005 | Hansen et al. | |
| 2005/0177974 A1 * | 8/2005 | Conrad et al. | 15/353 |
| 2006/0123590 A1 | 6/2006 | Fester et al. | |
| 2006/0168923 A1 * | 8/2006 | Lee et al. | 55/345 |
| 2007/0199449 A1 * | 8/2007 | Wiser et al. | 96/69 |
| 2007/0199451 A1 * | 8/2007 | Wiser | 96/69 |
| 2008/0250926 A1 * | 10/2008 | Riskin | 95/57 |
| 2010/0212104 A1 * | 8/2010 | Conrad | 15/347 |
| 2010/0236012 A1 | 9/2010 | Horne | |
| 2010/0242214 A1 * | 9/2010 | Sunderland et al. | 15/347 |
| 2010/0242215 A1 * | 9/2010 | Dyson et al. | 15/347 |
| 2010/0242216 A1 * | 9/2010 | MacNaughton | 15/347 |
| 2010/0242217 A1 * | 9/2010 | Sunderland et al. | 15/347 |
| 2010/0242218 A1 * | 9/2010 | Genn et al. | 15/347 |
| 2010/0242219 A1 * | 9/2010 | Dyson et al. | 15/347 |
| 2010/0242220 A1 * | 9/2010 | Dyson et al. | 15/347 |
| 2011/0016659 A1 | 1/2011 | Dyson et al. | |
| 2011/0016660 A1 | 1/2011 | Horne | |
| 2011/0016661 A1 | 1/2011 | Dyson et al. | |
| 2011/0016662 A1 | 1/2011 | Horne | |
| 2011/0016663 A1 | 1/2011 | Horne | |

FOREIGN PATENT DOCUMENTS

| | | |
|---|---|---|
| DE | 38 04 651 | 8/1989 |
| EP | 0 042 723 | 8/1985 |
| EP | 0 299 197 | 1/1989 |
| EP | 0 443 254 | 8/1991 |
| EP | 0 815 788 | 1/1998 |
| EP | 1 239 760 | 10/2003 |
| EP | 1 688 078 | 8/2006 |
| EP | 1 733 795 | 12/2006 |
| FR | 2 859 372 | 3/2005 |
| FR | 2 884 857 | 10/2006 |
| GB | 2 033 256 | 5/1980 |
| GB | 2 349 105 | 10/2000 |
| GB | 2 365 324 | 2/2002 |
| GB | 2 384 451 | 7/2003 |
| GB | 2 418 163 | 3/2006 |
| GB | 2 435 626 | 9/2007 |
| JP | 43-10791 | 5/1968 |
| JP | 55-101758 | 8/1980 |
| JP | 56-53771 | 5/1981 |
| JP | 61-29856 | 2/1986 |
| JP | 7-39479 | 2/1995 |
| JP | 2005-21469 | 1/2005 |
| JP | 2006-136766 | 6/2006 |
| JP | 2006-205162 | 8/2006 |
| JP | 2007-167632 | 7/2007 |
| JP | 2007-252577 | 10/2007 |
| JP | 2007-296305 | 11/2007 |
| JP | 2008-272474 | 11/2008 |
| JP | 2009-11869 | 1/2009 |
| WO | WO-02/069777 | 9/2002 |
| WO | WO-02/069778 | 9/2002 |
| WO | WO-02/078506 | 10/2002 |
| WO | WO-2008/135708 | 11/2008 |

OTHER PUBLICATIONS

GB Search report mailed on Jun. 18, 2009 directed at application No. 0905500.5; 1 page.

International Search Report and Written Opinion mailed Aug. 2, 2011, directed to counterpart International Application No. PCT/GB2010/050494; 18 pages.

* cited by examiner

SEPARATING APPARATUS

REFERENCE TO RELATED APPLICATIONS

This application claims the priority of United Kingdom Application No. 0905500.5 filed Mar. 31, 2009 and United Kingdom Application No. 0912938.8 filed Jul. 24, 2009 the entire contents of which are incorporated herein by reference.

FIELD OF THE INVENTION

The present invention relates to a separating apparatus for separating particles from a fluid flow. Particularly, but not exclusively, the invention relates to a vacuum cleaner having such a separating apparatus for removing dust particles from a dust laden airstream.

BACKGROUND OF THE INVENTION

Known separating apparatus include those used in vacuum cleaners, for example cyclonic separating apparatus. Such cyclonic separating apparatus are known to comprise a low efficiency cyclone for separating relatively large particles and a high efficiency cyclone located downstream of the low efficiency cyclone for separating the fine particles which remain entrained within the airflow (see, for example, EP 0 042 723B).

Irrespective of the type of separating apparatus used, there may be a risk of a small amount of dirt and dust passing through the separating apparatus and being carried to the motor-driven fan unit. It is undesirable for dirt and dust particles to pass through the fan of a motor and fan unit because the fan may become damaged or may operate less efficiently.

In order to reduce this problem, some vacuum cleaners include a fine filter in an air flow path between the separating apparatus and the airflow generator. This filter is commonly known as a pre-motor filter and is used to extract any fine dirt and dust particles remaining in the air flow after it has passed through the separating apparatus.

It is also known to provide a filter in an air flow path downstream of the air flow generator in order to extract any remaining dirt and dust particles prior to the air flow exiting the appliance. This type of filter is known as a post-motor filter. The post-motor filter also captures particles produced by the brushes of the motor.

Filter assembly are used on the Dyson range of vacuum cleaners, for example, on model numbers DC04, DC07, DC12, DC14 and DC15. The principle by which filter assemblies of this type operate is described in GB 2349105 and EP 1239760B.

In vacuum cleaner applications it is desirable for the dust separating efficiency to be as high as possible while maintaining suitable filter lifetime.

SUMMARY OF THE INVENTION

Accordingly, the present invention provides a separating apparatus comprising, a first cyclonic cleaning stage, a second cyclonic cleaning stage arranged downstream of the first cyclonic cleaning stage, and a filter arranged downstream of the second cyclonic cleaning stage, wherein the filter is at least partially surrounded by the first cyclonic cleaning stage.

This advantageously provides a compact structure. In a preferred embodiment the filter may be a barrier filter. As used herein the term "barrier filter" shall be taken to mean a filter which captures and holds dirt and dust particles within the body of the filter.

In a preferred embodiment the filter may be elongate. In other words the filter is preferably longer than it is wide. In a preferred embodiment the filter may be arranged longitudinally through the separating apparatus. Preferably the longitudinal axis of the filter may be in line with the longitudinal axis of the separating apparatus. Ideally the filter may be housed down the centre of the separating apparatus.

The filter may be of any shape in cross section, for example it may be round, square or triangular in cross section. Alternatively the filter may be a sock filter. As used herein the term "sock filter" shall be taken to mean that the filter is generally tubular with a closed lower end. The filter may be deformable for example it may be made from a soft foldable material or fabric. The filter may be housed in a filter housing, for example an elongate filter housing. The filter may further comprise one or more seal, for example a seal made from a deformable material for example a plastics or rubber material. The seal is most preferably arranged such that during use of the separating apparatus all or substantially all of the air which passes out of the second cyclonic cleaning stage will pass into and through the filter.

The filter may be formed from any suitable material for example glass, fleece, polyester, polypropylene, polyurethane, polytetrafluoroethylene or any other suitable plastics material. In a preferred embodiment the filter medium may be an open cell reticulated plastics foam, for example a polyurethane foam. The polyurethane foam may be derived from either polyester or polyether.

In an alternative embodiment the filter may be formed from an organic material for example cotton, cellulose, paper or charcoal.

The filter medium may have a pore size of from 3, or 10, or 50, or 100, or 500, or 1000 pores per inch (PPI) with a pore diameter of from 0.1 micron or 0.5 mm, or 1 mm, or 1.5 mm, or 2 mm, or 2.5 mm, or 3 mm, or 3.5 mm to 4 mm, or 4.5 mm, or 5 mm, or 5.5 mm, or 6 mm, or 6.5 mm, or 7 mm, or 7.5 mmm, or 8 mm. In a particularly preferred embodiment the filter may be a HEPA filter or an ULPA filter.

The pore size or type of filter medium may vary along the length of the filter medium. For example the pore size may decrease or increase in a downstream direction. Such a change in pore size may be a gradual change which occurs in a single filter medium or a plurality of sections of filter medium may be brought together to form a filter medium which has a varying pore size across it's length. Again the pore size may decrease or increase in a downstream direction, or alternatively it may vary in another random or non random way.

In an alternative embodiment the filter may be an electrostatic filter, for example it may be a frictional electrostatic filter, an electret media filter or it may be an electrostatic filter connected to a high voltage power supply. In a preferred embodiment the high voltage power supply may be generated by a printed circuit board ("PCB") which is preferably located in the separating apparatus, for example in an exhaust manifold of the separating apparatus. The PCB may however be located on the main body of a surface treating apparatus to which the separating apparatus is removably attached during use.

The filter may alternatively be formed from a combination of any of the above materials. It may for example be formed from one or more layers of filter medium which may be glued, bonded or stitched together in any suitable way.

Ideally the first cyclonic cleaning stage comprises a single cylindrical cyclone and a dust collecting bin. The dust collecting bin may be formed from a lower section of the cylindrical cyclone itself or it may be in the form of a separate dust collecting bin removably attached to the base of the cylindrical cyclone.

The first cyclonic cleaning stage or a portion of it is arranged around the filter such that the filter is partially or totally surrounded by the first cyclonic cleaning stage. Ideally the external surface of the filter is not subject to the cyclonic airflow inside the first cyclonic cleaning stage. In other words the filter is not inside the single cylindrical cyclone, but it is housed within and surrounded by the first cyclonic cleaning stage.

In a preferred embodiment the first cyclonic cleaning stage may be arranged around the second cyclonic cleaning stage or a portion of the second cyclonic cleaning stage, such that the second cyclonic cleaning stage or a portion of it is surrounded by the first cyclonic cleaning stage. In this embodiment the second cyclonic cleaning stage or a portion of it may therefore be housed within the first cyclonic cleaning stage. In a preferred embodiment the second cyclonic cleaning stage or a portion of it may be located longitudinally through the first cyclonic cleaning stage. The first cyclonic cleaning stage may therefore be annular in shape.

In a particular embodiment the second cyclonic cleaning stage may comprise a plurality of secondary cyclones arranged in parallel and a dust collecting bin, which may be arranged below the secondary cyclones. In a preferred embodiment the secondary cyclones may be formed in a ring above or at least partially above the first cyclonic cleaning stage. Ideally the secondary cyclones are centered about the longitudinal axis of the first cyclonic cleaning stage.

In a preferred embodiment the dust collecting bin of the second cyclonic cleaning stage may be arranged longitudinally through the separating apparatus such that it is surrounded by and housed within the first cyclonic cleaning stage.

Ideally the filter is located longitudinally through the centre of the second cyclonic cleaning stage. In such an embodiment the dust collecting bin of the second cyclonic cleaning stage may also be annular in shape. In such an embodiment the first cyclonic cleaning stage, the second cyclonic cleaning stage and the filter may be arranged concentrically. Preferably they are arranged about a common central axis of the separating apparatus. Preferably the secondary cyclones surround a top portion of the filter and the dust collecting bin of the second cyclonic cleaning stage surrounds a lower portion of the filter.

In a preferred embodiment the filter is separate from, but in fluid communication with, the second cyclonic cleaning stage. The term "separate from" as used herein shall be taken to mean that the filter is not subjected to the cyclonic airflow set up inside the cyclonic cleaning stages during use.

The filter may be directly downstream of the second cyclonic cleaning stage or it may be in fluid communication with the second cyclonic cleaning stage via an air passage.

In a particular embodiment the filter may extend from a top edge of the second cyclonic cleaning stage to at or near a base of the separating apparatus. Preferably the filter may extend along 40, or 45, or 50, or 55, or 60, or 65, or 70, or 75, to 80, or 85, or 90, or 95, or 100 percent of the distance between the top edge of the second cyclonic cleaning stage and the base of the separating apparatus. Alternatively or additionally the filter may extend from 50, or 55, or 60, or 65, or 70, to 75, or 80, or 85, or 90, or 95, or 100 percent of the length of the separating apparatus.

A second aspect of the present invention provides a vacuum cleaner comprising a separating apparatus as described above. In a particular embodiment the separating apparatus may be removably mounted to a main body of the vacuum cleaner.

BRIEF DESCRIPTION OF THE DRAWINGS

The invention will now be described, by way of example, with reference to the accompanying drawings, in which:

FIG. 6b is a horizontal section through the embodiment shown in FIG. 6a;

FIG. 8b is a perspective view of the cross-over duct assembly of the separating apparatus of FIG. 8a;

Like reference numerals refer to like parts throughout the specification.

DETAILED DESCRIPTION OF THE INVENTION

Figure 1:
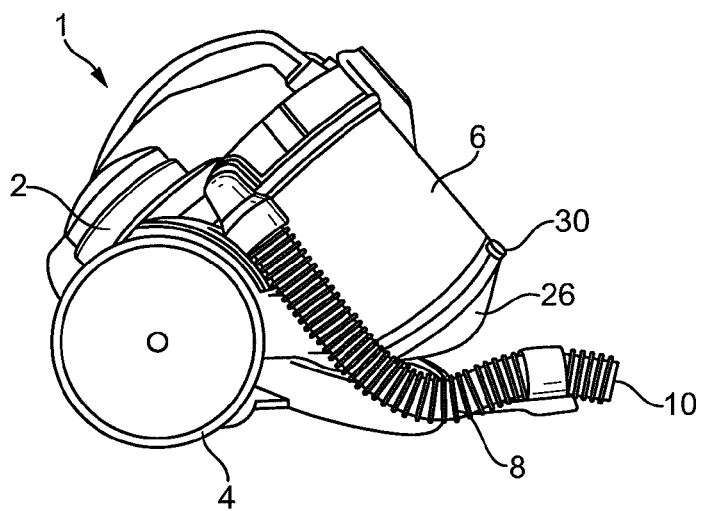
FIG. 1 is a canister vacuum cleaner incorporating a separating apparatus according to the present invention.
Figure 2:
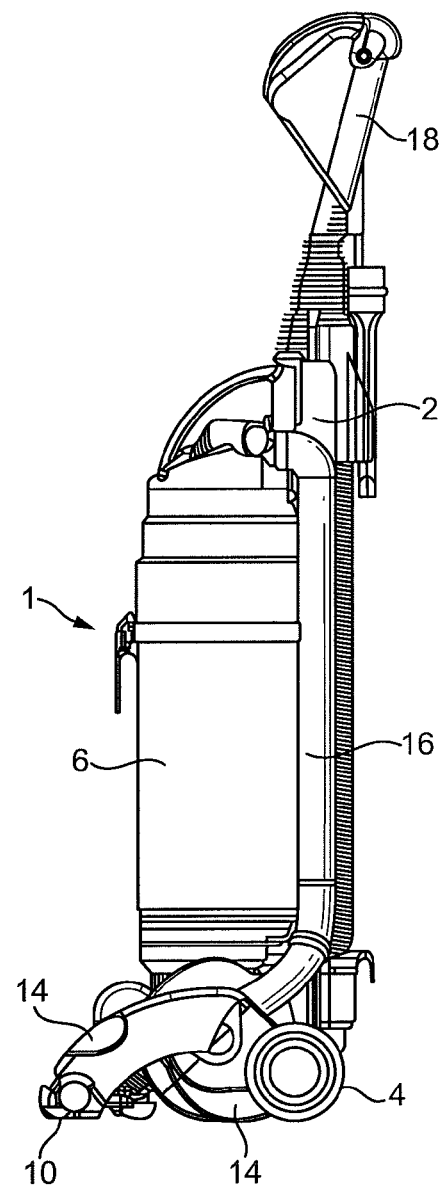
FIG. 2 is an upright vacuum cleaner incorporating a separating apparatus according to the present invention.

With reference to FIGS. 1 and 2 a vacuum cleaner is shown and indicated generally by the reference numeral 1.

In FIG. 1 the vacuum cleaner 1 comprises a main body 2, wheels 4 mounted on the main body 2 for manoeuvring the vacuum cleaner 1 across a surface to be cleaned, and a separating apparatus 6 removably mounted on the main body 2. A hose 8 communicates with the separating apparatus 6 and a motor and fan unit (not shown) is housed within the main body 2 for drawing dust laden air into the separating apparatus 6 via the hose 8. Commonly, a floor-engaging cleaner head (not shown) is coupled to the distal end of the hose 8 via a wand to facilitate manipulation of a dirty air inlet 10 over the surface to be cleaned.

In use, dust laden air drawn into the separating apparatus 6 via the hose 8 has the dust particles separated from it in the separating apparatus 6. The dirt and dust is collected within the separating apparatus 6 while the cleaned air is channeled past the motor for cooling purposes before being ejected from the vacuum cleaner 1.

The upright vacuum cleaner 1 shown in FIG. 2 has a main body 2 in which a motor and fan unit (not shown) is mounted and on which wheels 4 are mounted to allow the vacuum cleaner 1 to be manoeuvred across a surface to be cleaned. A cleaner head 14 is pivotably mounted on the lower end of the main body 2 and a dirty air inlet 10 is provided on the underside of the cleaner head 14 facing the surface to be cleaned. A separating apparatus 6 is removably provided on the main body 2 and ducting 16 provides communication between the dirty air inlet 10 and the separating apparatus 6. A wand and handle assembly 18 is releasably mounted on the main body 2 behind the separating apparatus 6.

In use, the motor and fan unit draws dust laden air into the vacuum cleaner 1 via either the dirty air inlet 10 or the wand 18. The dust laden air is carried to the separating apparatus 6 via the ducting 16 and the entrained dust particles are separated from the air and retained in the separating apparatus 6. The cleaned air is passed across the motor for cooling purposes and then ejected from the vacuum cleaner 1.

The separating apparatus 6 forming part of each of the vacuum cleaners 1 is shown in more detail in FIGS. 3a, 3b, 5, 6a, 6b and 7. The specific overall shape of the separating apparatus 6 can be varied according to the type of vacuum cleaner 1 in which the separating apparatus 6 is to be used. For example, the overall length of the separating apparatus 6 can be increased or decreased with respect to the diameter of the separating apparatus 6.

Figure 4:
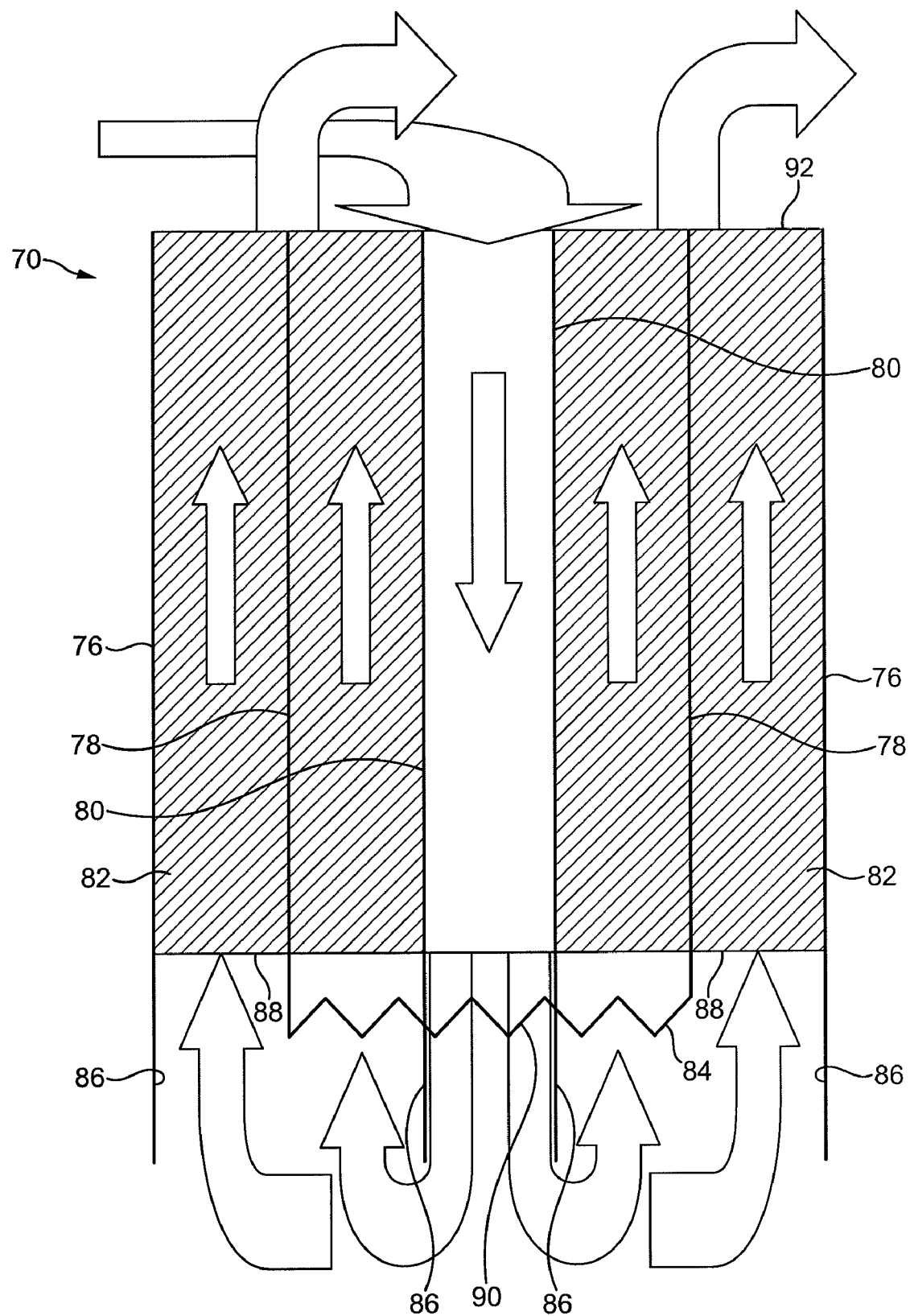
FIG. 4 is a schematic section through the electrostatic filter shown in FIG. 3.

The separating apparatus 6 comprises a first cyclonic cleaning stage 20, a second cyclonic cleaning stage 22 and an electrostatic filter 70 located longitudinally through the separating apparatus 6. An embodiment of the electrostatic filter can be seen in more detail in FIG. 4.

The first cyclonic cleaning stage 20 can be seen to be the annular chamber 38 located between the outer wall 24 which is substantially cylindrical in shape and the second cylindrical wall 36 which is located radially inwardly from the outer wall 24 and spaced from it. The lower end of the first cyclonic cleaning stage 20 is closed by a base 26 which is pivotably attached to the outer wall 24 by means of a pivot 28 and held in a closed position by a catch 30. In the closed position, the base 26 is sealed against the lower ends of the walls 24, 36. Releasing the catch 30 allows the base 26 to pivot away from the outer wall 24 and the second cylindrical wall 36 for emptying the first cyclonic cleaning stage 20 and the second cyclonic cleaning stage 22

In this embodiment the top portion of the annular chamber 38 forms a cylindrical cyclone 32 of the first cyclonic cleaning stage 22 and the lower portion forms a dust collecting bin 34. The second cyclonic cleaning stage 22 comprises 12 secondary cyclones 50 which are arranged in parallel and a second dust collecting bin 64.

A dust laden air inlet 40 is provided in the outer wall 24 of the first stage cyclone 20. The dust laden air inlet 40 is arranged tangentially to the outer wall 24 so as to ensure that incoming dust laden air is forced to follow a helical path around the annular chamber 38. A fluid outlet from the first cyclonic cleaning stage 20 is provided in the form of a shroud 42. The shroud 42 comprises a cylindrical wall 44 in which a large number of perforations 46 are formed. The only fluid outlet from the first cyclonic cleaning stage 20 is formed by the perforations 46 in the shroud 42.

A passageway 48 is formed downstream of the shroud 42. The passageway 48 communicates with the second cyclonic cleaning stage 22. The passageway 48 may be in the form of an annular chamber which leads to inlets 52 of the secondary cyclones 50 or may be in the form of a plurality of distinct air passageways each of which leads to a separate secondary cyclone 50.

A third cylindrical wall 54 extends downwardly from a vortex finder plate 56 which forms a top surface of each of the secondary cyclones 50, towards the base 26. The third cylindrical wall 54 is located radially inwardly of the second cylindrical wall 36 and is spaced from it so as to form a second annular chamber 58 between them.

Figure 5:
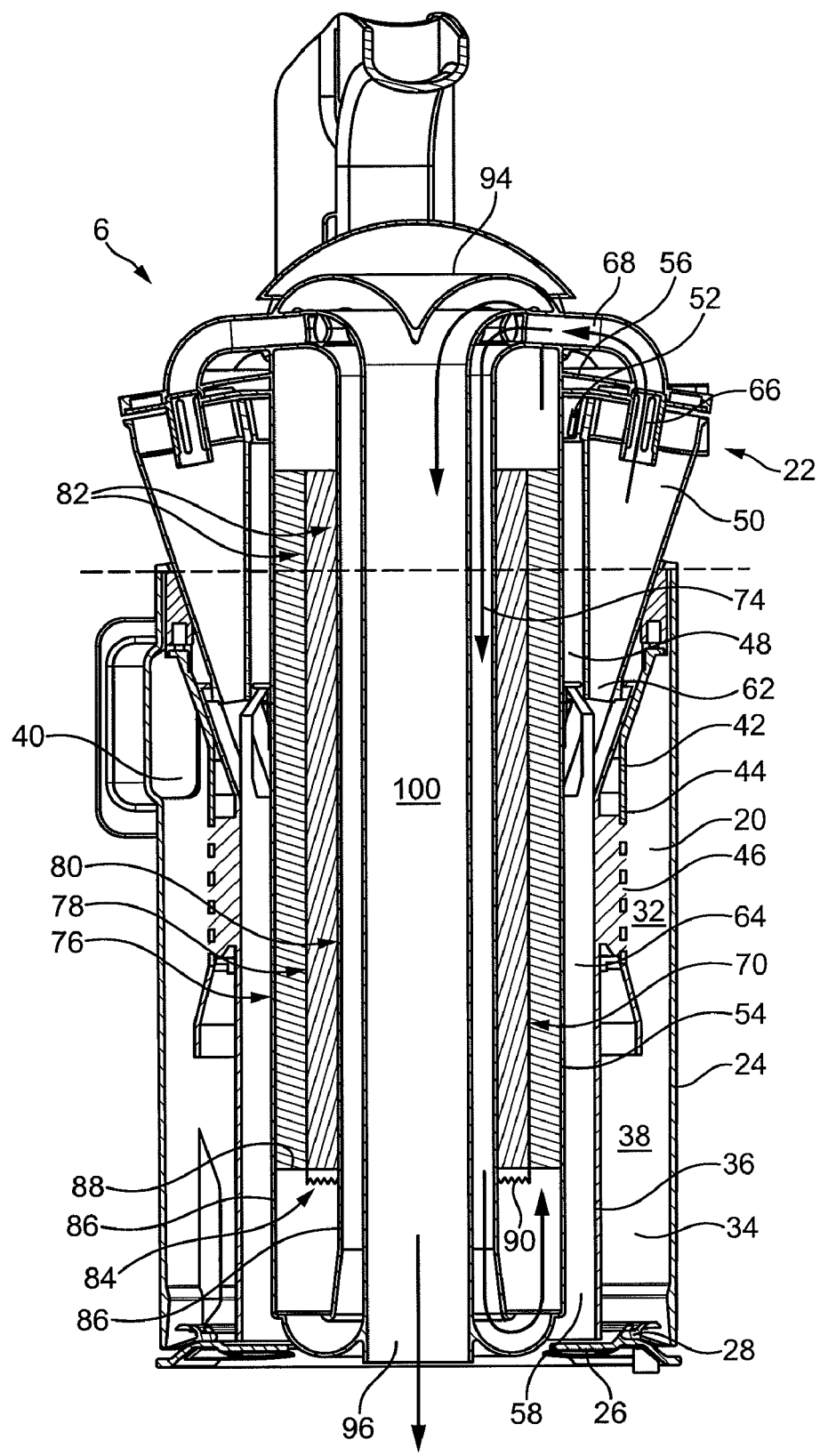
FIG. 5 is a section through an alternative embodiment of a separating apparatus.
Figure 6A:
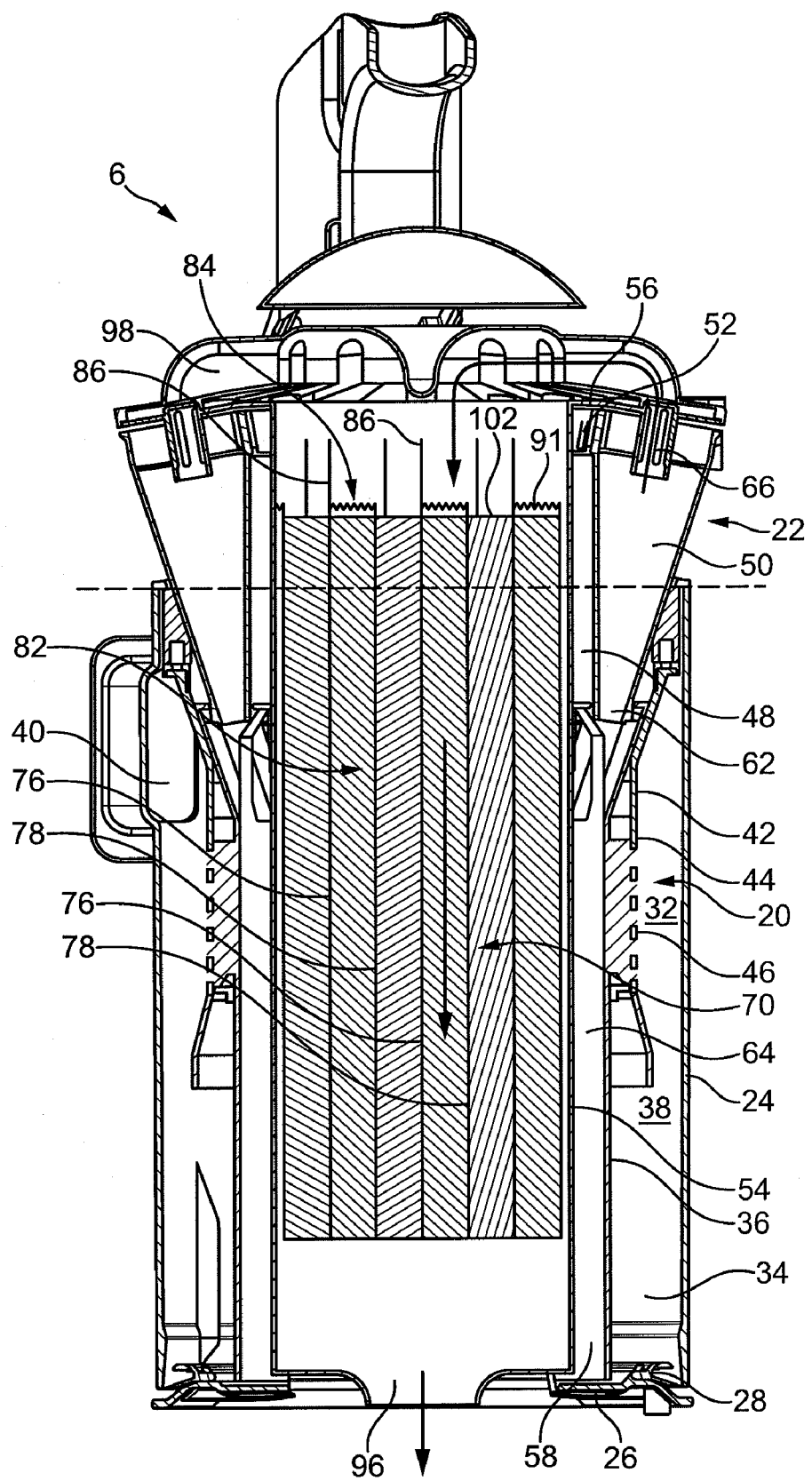
FIG. 6a is a longitudinal section through an alternative embodiment of a separating apparatus.

When the base 26 is in the closed position, the third cylindrical wall 54 may reach down to and be sealed against the base 26 as shown in FIGS. 5 and 6a. Alternatively as shown in FIGS. 3a and 7 the third cylindrical wall 54 may stop short of the base 26 and may be sealed by an electrostatic filter base plate 60.

The secondary cyclones 50 are arranged in a circle substantially or totally above the first cyclonic cleaning stage 20. A portion of the secondary cyclones 50 may project into the top of the first cyclonic cleaning stage 20. The secondary cyclones 50 are arranged in a ring which is centred on the axis of the first cyclonic cleaning stage 20. Each secondary cyclone 50 has an axis which is inclined downwardly and towards the axis of the first cyclonic cleaning stage 20.

Each secondary cyclone 50 is frustoconical in shape and comprises a cone opening 62 which opens into the top of the second annular chamber 58. In use dust separated by the secondary cyclones 50 will exit through the cone openings 62 and will be collected in the second annular chamber 58. The second annular chamber 58 thus forms the dust collecting bin 64 of the second cyclonic cleaning stage 22. A vortex finder 66 is provided at the upper end of each secondary cyclone 50. The vortex finders 66 may be an integral part of the vortex finder plate 56 or they may pass through the vortex finder plate 56. In all of the embodiments shown the vortex finders fluidly connect with the electrostatic filter 70.

Figure 3A:
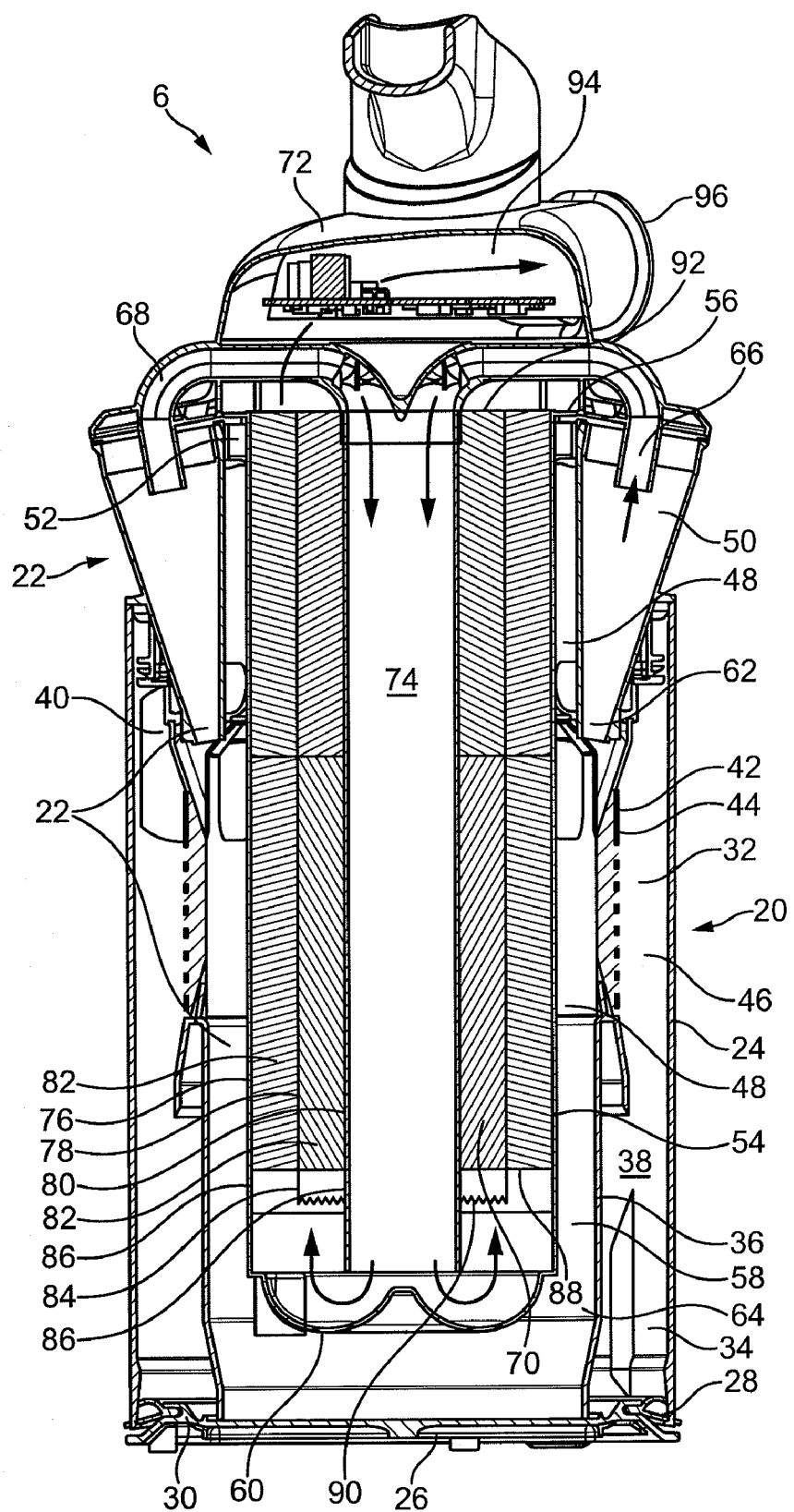
FIG. 3a is a longitudinal section through the separating apparatus shown in FIGS. 1 and 2.
Figure 7:
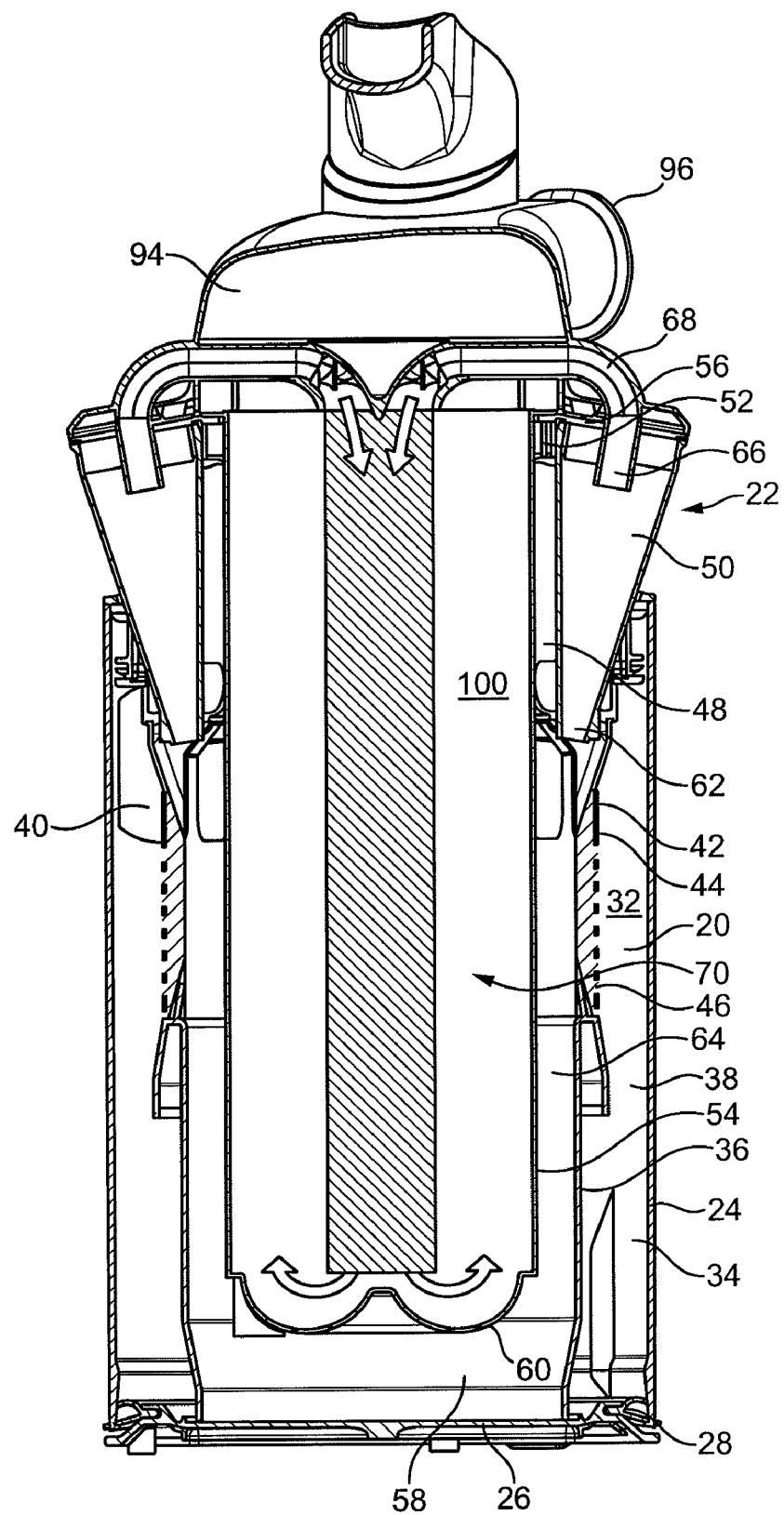
FIG. 7 is a section through an alternative embodiment of a separating apparatus.

In the embodiments shown in FIGS. 3a, 5 and 7 the vortex finders 66 lead into vortex fingers 68 which in FIGS. 3a and 5 communicate with an air passage 74 which leads to the lower end of the electrostatic filter 70 and in FIG. 7 communicates directly with the top end of the electrostatic filter 70. It is however possible that the vortex finders 66 could communicate with a plenum or manifold 98 which in turn communicates with an air passage or directly with the electrostatic filter 70. In FIG. 6a it can be seen that the vortex finders 66 communicate with a plenum 98 which communicates directly with the top end of the electrostatic filter 70.

Figure 3B:
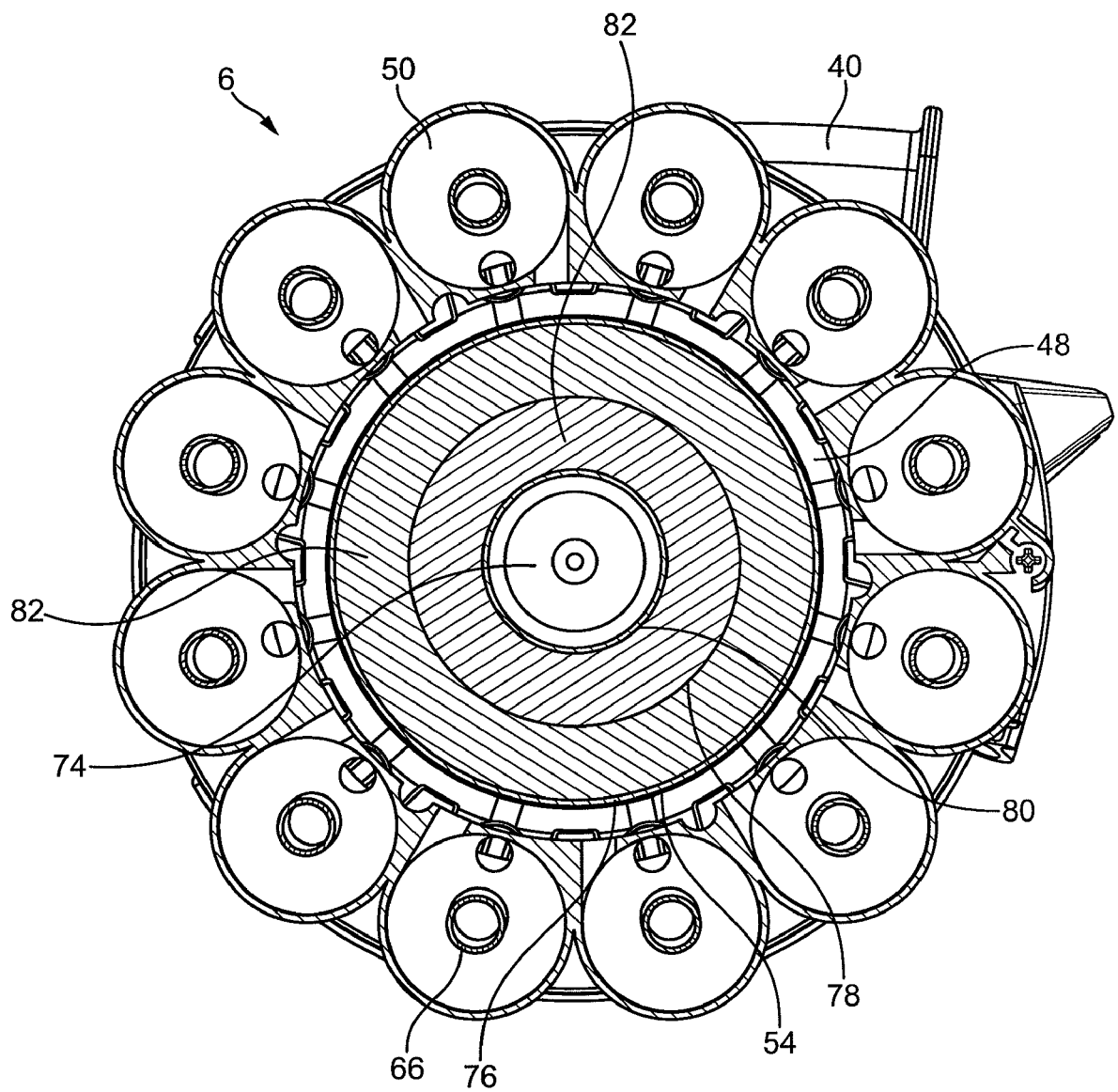
FIG. 3b is a horizontal section through the separating apparatus shown in FIGS. 1 and 2.

In FIGS. 3a and 3b it can be seen that the air passage 74 is arranged longitudinally down the centre of the separating apparatus 6. The electrostatic filter 70 is arranged around the air passage 74 such that the air passage 74 is partially or totally surrounded by the electrostatic filter 70. An upper end of the electrostatic filter 70 is fluidly connected to the exit port 96 of the separating apparatus 6 via the exhaust manifold 94. The exhaust manifold 94 at least partially surrounds the vortex fingers 68 to form an exhaust manifold containing two fluidly distinct air passages, the first being the exhaust manifold 94 itself and the second being the vortex fingers 68.

In FIG. 5 it can be seen that the air passage 74 is annular in shape and is at least partially surrounded by the electrostatic filter 70. The air passage 74 is arranged to provide a fluid passageway, or individual fluid passageways to the lower end of the electrostatic filter 70. An exhaust passage 100 provides a fluid passageway between the upper end of the electrostatic filter 70 and the exit port 96 which is located on a lower end of the separating apparatus 6. The exhaust passage 100 is arranged longitudinally down the centre of the separating apparatus 6. The air passage 74 is arranged around the exhaust passage 100 such that the exhaust passage 100 is partially or totally surrounded by the air passage 74.

In FIG. 6a it can be seen that the plenum 98 fluidly connects the vortex finders 66 and the electrostatic filter 70. A lower end of the electrostatic filter 70 is fluidly connected to the exit port 96 of the separating apparatus 6 which is located at a lower end of the separating apparatus 6. In this embodiment there is no air passage or exhaust passage.

In FIG. 7 it can be seen that the vortex fingers 68 lead directly to the electrostatic filter 70. An annular exhaust passage 100 is arranged around the electrostatic filter 70 such that the electrostatic filter 70 is arranged longitudinally down the centre of the separating apparatus 6 and is partially or totally surrounded by the annular exhaust passage 100. An upper end of the annular exhaust passage 100 is fluidly connected to the exit port 96 of the separating apparatus 6 via the exhaust manifold 94 located at an upper end of the separating apparatus 6. Again the exhaust manifold 94 at least partially surrounds the vortex fingers 68 to form an exhaust manifold 94 containing two fluidly distinct air passages, the first being the exhaust manifold 94 itself and the second being the vortex fingers 68.

In all of the embodiments described above the electrostatic filter 70 is arranged longitudinally down the separating apparatus 6 such that the secondary cyclones 50 and at least a portion of the dust collecting bin 64 surround the electrostatic filter 70. It can be seen that the secondary cyclones 50 surround a top portion of the electrostatic filter 70 and the dust collecting bin 64 surrounds a lower portion of the electrostatic filter 70. It can also be seen that the electrostatic filter 70 extends from the vortex finder plate 56 to near the base 26.

In the embodiment shown in FIGS. 3a, 3b, 4 and 5 the electrostatic filter 70 comprises concentrically arranged cylindrical first, second and third electrodes 76, 78, 80. A filter medium 82 is located between both the first and second electrodes 76, 78 and the second and third electrodes 78, 80.

The electrostatic filter 70 also comprises a corona discharge device in the form of a corona discharge electrode 84 and two electrodes of low curvature 86. The electrostatic filter 70 would however function without the corona discharge device.

The first electrode of low curvature 86 is an extension of the first electrode 76 below a lower surface 88 of the filter medium 82 and the second electrode of low curvature 86 is an extension of the third electrode 80 below the lower surface 88 of the filter medium 82.

The corona discharge electrode 84 is in the form of a serrated lower edge 90 of the second electrode 78 which extends below the lower surface 88 of the filter medium 82. The electrodes of low curvature 86 can be seen to project both upstream and downstream of the serrated lower edge 90 of the corona discharge electrode 84.

The first and third electrodes 76, 80 are at 0 Volts and the second electrode 78 is at from −4 to −10 kV. The electrodes 76, 78, 80 are connected to a high voltage power supply. The high voltage power supply is generated by a PCB 93 which is preferably located in an exhaust manifold 94.

The electrodes 76, 78, 80 may be formed from any suitable conductive material, for example aluminium.

Figure 6B:
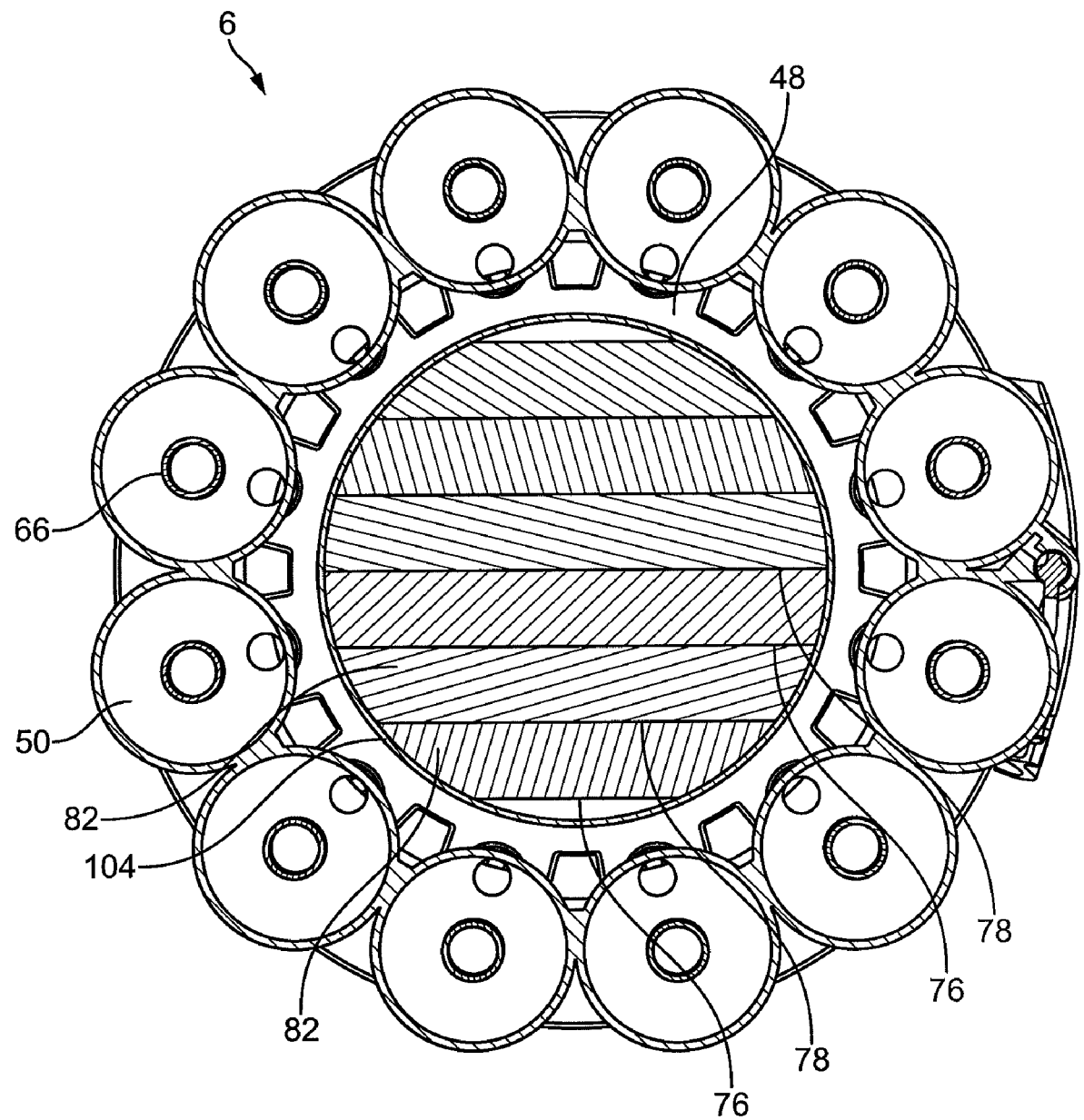

In the embodiment shown in FIGS. 6a and 6b the electrostatic filter 70 comprises a plurality of first and second flat plate electrodes 76, 78 which are arranged in parallel. Filter media 82 is located between each adjacent first and second electrodes 76, 78 to form a layered electrostatic filter 70. The electrostatic filter 70 may be any shape in cross section but is preferably cylindrical. The first and second electrodes 76, 78 are arranged inside the third cylindrical wall 54 which provides a tubular passageway which forms an outer surface of the electrostatic filter 70. The first and second electrodes 76, 78 are arranged longitudinally to provide a plurality of parallel air passages which run longitudinally through the electrostatic filter 70.

The electrostatic filter 70 also comprises a corona discharge device in the form of corona discharge electrodes 84 and electrodes of low curvature 86. The electrostatic filter 70 would however function without the corona discharge device. Each electrode of low curvature 86 is an extension of a first electrode 76 above the upper surface 102 of the filter media 82. The corona discharge electrodes 84 are in the form of serrated upper edges 91 of the second electrodes 78 which extend above the upper surfaces 102 of the filter medium 82. The electrodes of low curvature 86 can be seen to project both upstream and downstream of the serrated upper edges 91 of the corona discharge electrodes 84.

The first electrodes 76 are at 0 Volts and the second electrodes 78 are at from −4 to −10 kV. The electrodes 76, 78 are connected to a high voltage power supply.

In FIG. 7 it can be seen that the electrostatic filter 70 described above has been replaced with an alternative type of electrostatic filter 70. In this embodiment the electrostatic filter 70 may be a frictional electrostatic filter or an electret medium electrostatic filter 70. Alternatively it may be any other suitable type of filter, for example a filter formed from a plastics and/or an organic material.

This electrostatic filter 70 could of course be replaced by an electrostatic filter 70 as described in relation to FIGS. 3a, 3b, 4, 5, 6a and 6b. Equally the electrostatic filter 70 described in FIGS. 3a, 3b, 4, 5, 6a and 6b could be replaced with a different type of filter 70, for example a frictional electrostatic filter, electret medium filter, a filter formed from a plastics and/or organic matter.

During use of the embodiments described above dust laden air enters the separating apparatus 6 via the dust laden air inlet 40 and, because of the tangential arrangement of the inlet 40, the dust laden air follows a helical path around the outer wall 24. Larger dirt and dust particles are deposited by cyclonic action in the annular chamber 38 and collected in the dust collecting bin 34. The partially-cleaned dust laden air exits the annular chamber 38 via the perforations 46 in the shroud 42 and enters the passageway 48. The partially-cleaned dust laden air then passes into tangential inlets 52 of the secondary cyclones 50. Cyclonic separation is set up inside the secondary cyclones 50 so that separation of some of the dust particles which are still entrained within the airflow occurs. The dust particles which are separated from the airflow in the secondary cyclones 50 are deposited in the second annular chamber 58 which forms at least part of the dust collecting bin 64 of the second cyclonic cleaning stage 22. The further cleaned dust laden air then exits the secondary cyclones 50 via the vortex finders 66. The further cleaned dust laden air then passes into the electrostatic filter 70.

In the embodiment shown in FIGS. 3a and 3b, the further cleaned dust laden air passes out of the vortex finders 66, along the vortex fingers 68 and down the air passage 74 towards the lower end of the electrostatic filter 70. The air then travels past the corona discharge device formed from the corona discharge electrode 84 and the electrodes of low curvature 86 such that any dust particles remaining in the further cleaned dust laden air become charged. The further cleaned dust laden air containing the charged dust then travels upwardly through the filter medium 82. A potential difference is generated across the filter medium 82 causing the charged dust particles to be attracted to respective positive and negative ends of the filter medium 82, thus trapping them within the filter medium 82.

The cleaned air then leaves the top of the electrostatic filter 70 via apertures 92 in the vortex finder plate 56 and enters the exhaust manifold 94. The cleaned air then exhausts the separating apparatus 6 via the exit port 96.

In the embodiment shown in FIG. 5, the further cleaned dust laden air passes out of the vortex finders 66, along the vortex fingers 68 and down the air passage 74 towards the bottom end of the electrostatic filter 70. The air then travels past the corona discharge device formed from the corona discharge electrode 84 and the electrodes of low curvature 86 such that any dust particles remaining in the further cleaned dust laden air become charged. The further cleaned dust laden air containing the charged dust then travels upwardly through the filter medium 82. A potential difference is generated across the filter medium 82 causing the charged dust particles to be attracted to respective positive and negative ends of the filter medium 82, thus trapping them within the filter medium 82.

The cleaned air then leaves the top of the electrostatic filter 70 and enters the exhaust passage 100 which directs air downwardly through the centre of the separating apparatus 6 to the exit port 96 which is located on the lower end of the separating apparatus 6.

In the embodiment shown in FIGS. 6a and 6b, the further cleaned dust laden air passes out of the vortex finders 66 and enters the plenum 98. The air passes through the plenum 98 and enters the top of the electrostatic filter 70. The air then travels past the corona discharge device formed from the corona discharge electrode 84 and the electrodes of low curvature 86 such that any dust particles remaining in the further cleaned dust laden air become charged. The further cleaned dust laden air containing the charged dust then travels downwardly through the filter medium 82. A potential difference is generated across the filter medium 82 causing the charged dust particles to be attracted to respective positive and negative ends of the filter medium 82, thus trapping them within the filter medium 82.

The cleaned air then leaves the lower end of the electrostatic filter 70 and exhausts the separating apparatus 6 via the exit port 96 located on the lower end of the separating apparatus 6.

In the embodiment shown in FIG. 7, the further cleaned dust laden air passes out of the vortex finders 66, along the vortex fingers 68 and into the electrostatic filter 70. The further cleaned dust laden air travels downwardly through electrostatic filter 70. The cleaned air then leaves the lower end of the electrostatic filter 70 and travels up the exhaust passage 100 to exit the separating apparatus 6 via the exit port 96 located on the upper end of the separating apparatus 6.

It will be appreciated from the description that the separating apparatus 6 includes two distinct stages of cyclonic separation and a distinct stage of electrostatic filtration. The first cyclonic cleaning stage 20 comprises a single cylindrical cyclone 32. The relatively large diameter of the outer wall 24 of which means that comparatively large particles of dirt and debris will be separated from the air because the centrifugal forces applied to the dirt and debris are relatively small. Some fine dust will be separated as well. A large proportion of the larger debris will reliably be deposited in the dust collecting bin 34.

There are 12 secondary cyclones 50, each of which has a smaller diameter than the cylindrical cyclone 32 and so is capable of separating finer dirt and dust particles than the cylindrical cyclone 32. They also have the added advantage of being challenged with air which has already been cleaned by the cylindrical cyclone 32 and so the quantity and average size of entrained dust particles is smaller than would otherwise have been the case. The separation efficiency of the secondary cyclones 50 is considerably higher than that of the cylindrical cyclone 32 however some small particles will still pass through the secondary cyclones 50 to the electrostatic filter 70.

In all of the embodiments described above the filter medium 82 may be formed from any suitable material for example an open cell reticulated polyurethane foam derived from a polyester.

The filter medium 82 has a pore size in the range of 6 to 12 PPI and preferably 8 to 10 PPI. The pore size of the filter medium 82 shown in FIG. 3 varies along its length because it is formed from two sections each having a different pore size. In the embodiment shown in FIG. 4 the upstream portion has a pore size of 8 PPI and the downstream portion has a pore size of 10 PPI.

A further embodiment is shown in FIG. 8. In this embodiment it can be seen that the separating apparatus comprises a filter 136. The filter comprises a rim 600, a base cap 602, and four cylindrical filter members located between the rim 600 and the base cap 602. The filter 136 is generally cylindrical in shape, and comprises a central open chamber 612 bounded by the rim 600, the base cap 602 and an innermost, first filter member 604.

The filter 136 is constructed such that it is pliable, flexible and resilient. The rim 600 is annular in shape having a width, W in a direction Z perpendicular to the axis X. The rim 600 is manufactured from a material with a hardness and deformability that enable a user to deform the rim 600 (and thus the filter 136) by pressing or grasping the rim 600 and twisting and squeezing the filter 136 by hand, in particular during a washing operation. In this embodiment, the rim 600 and base cap 602 are formed from polyurethane.

Each filter member of the filter 136 is manufactured with a rectangular shape. The four filter members are then joined and secured together along their longest edge by stitching, gluing or other suitable technique so as to form a pipe length of filter material having a substantially open cylindrical shape. An upper end of each cylindrical filter member is then bonded to the rim 600, while a lower end of each filter member is bonded to the base cap 602, preferably by over-moulding the polyurethane material of the rim 600 and base cap 602 during manufacture of the filter assembly 136. Alternative manufacturing techniques for attaching the filter members include gluing, and spin-casting polyurethane around the upper and lower ends of the filter members. In this way the filter members are encapsulated by polyurethane during the manufacturing process to produce a strengthened arrangement capable of withstanding manipulation and handling by a user, particularly during washing of the filter 136.

The first filter member 604 comprises a layer of scrim or web material having an open weave or mesh structure. A second filter member 606 surrounds the first filter member 604, and is formed from a non-woven filter medium such as fleece. The shape and volume of the second filter member 606 is selected so as to substantially fill the volume delimited by the width, W, of rim 600 and the height of the filter 136. Therefore, the width of the second filter member 606 is substantially the same as the width, W, of the rim 600.

The third filter member 608 surrounds the second filter member 606, and comprises an electrostatic filter medium covered on both sides by a protective fabric. The layers are held together in a known manner by stitching or other seal.

The fourth filter member 610 surrounds the third filter member 608, and comprises a layer of scrim or web material having an open weave or mesh structure.

During manufacture an upper part of the first filter member 604 is bonded to the rim 600 and the base cap 602 immediately adjacent the second filter member 606. An upper part of the third filter member 608 is bonded to the rim 600 and the base cap 602 immediately adjacent the second filter member 606, and an upper part of the fourth filter member 610 is bonded to the rim 600 and the base cap 602 immediately adjacent the third filter member 608. In this manner the filter members 604, 606, 608, 610 are held in position in the filter assembly 136 with respect to the rim 600 and the base cap 602 such that an airflow will impinge first on the first filter member, before impinging, in turn, on the second, third and fourth filter members. For the third filter member 608, comprising an electrostatic filter medium covered on both sides by a protective fabric, it is preferred that all of the layers of the third filter member 608 are bonded to the rim 600 and the base cap 602 so that the risk of delamination of the second filter member 606 during use is reduced.

In this embodiment during use, once the air has passed out of the second cyclonic cleaning stage 22 it passes through the central open chamber 612, and is forced tangentially outwardly towards the filter members of the filter 136. The airflow enters the first filter member 604 first, and then passes sequentially through the second filter member 606, the third filter member 608 and the fourth filter member 610, with dirt and dust being removed from the air flow as it passes through each filter member.

The airflow emitted from the filter 136 passes into the cylindrical chamber 132 and is drawn into the filter outlet ducts 176 to exit at the top end 72 of the separating apparatus.

Because of the arrangement of the filter 136 in this embodiment the separating apparatus further comprises a cross-over duct assembly 138. The cross-over duct assembly 138 is shown in FIG. 8b and comprises an annular seal 162 and a cross-over duct 164. In the preferred embodiment the seal 162 is rubber, and is secured around the outer surface of the cross-over duct 164 with a friction fit. The cross-over duct 164 comprises an upper portion and a lower portion. The seal 162 is located on an upper portion of the cross-over duct 164. The upper portion of the cross-over duct 164 comprises a generally cup shaped portion 166 which provides a fluid outlet from the separating apparatus, and which has a convex, preferably hemispherical outer surface. The lower portion of the cross-over duct 164 comprises a lip 168 and a cylindrical outer housing 170 shaped to correspond to the size and shape of the cylindrical chamber 132. The lip 168 is shaped to have a diameter slightly larger than that of the cylindrical outer housing 170 and is located towards the upper end of the cylindrical outer housing 170. An inlet chamber 172 is formed between the upper portion and the lower portion of the cross-over duct 164. The inlet chamber 172 is bounded by the lower surface of the cup shaped portion 166, the upper surface of the cylindrical outer housing 170 and the lip 168.

The cross-over duct 164 comprises a first set of ducts in which air passes in a first direction through the cross-over duct 164, and a second set of ducts in which air passes in a second direction, different from the first direction, through the cross-over duct 164. In this embodiment, eight ducts are located within the cylindrical outer housing 170 of the cross-over duct 164. These ducts comprise a first set of four filter inlet ducts 174, and a second set of four filter outlet ducts 176. The filter inlet ducts 174 are arranged in an annular formation which is centred on the axis X and in which the filter inlet ducts 174 are evenly spaced. The filter outlet ducts 176 are similarly evenly arranged and spaced about the axis X, but are angularly offset from the filter inlet ducts 174 by an angle of around 45 degrees.

Figure 8A:
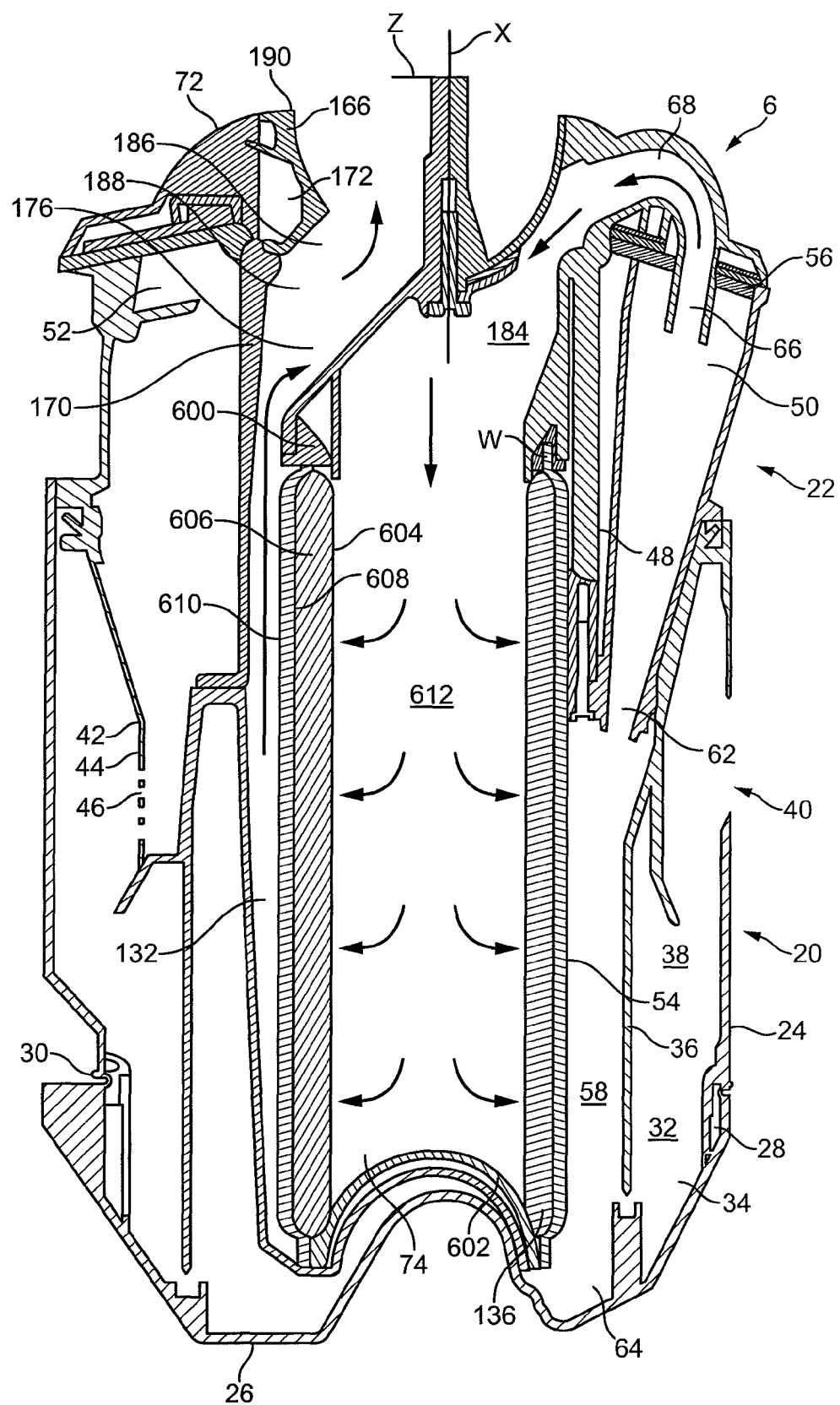
FIG. 8a is a section through an alternative embodiment of separating apparatus.
Figure 8B:
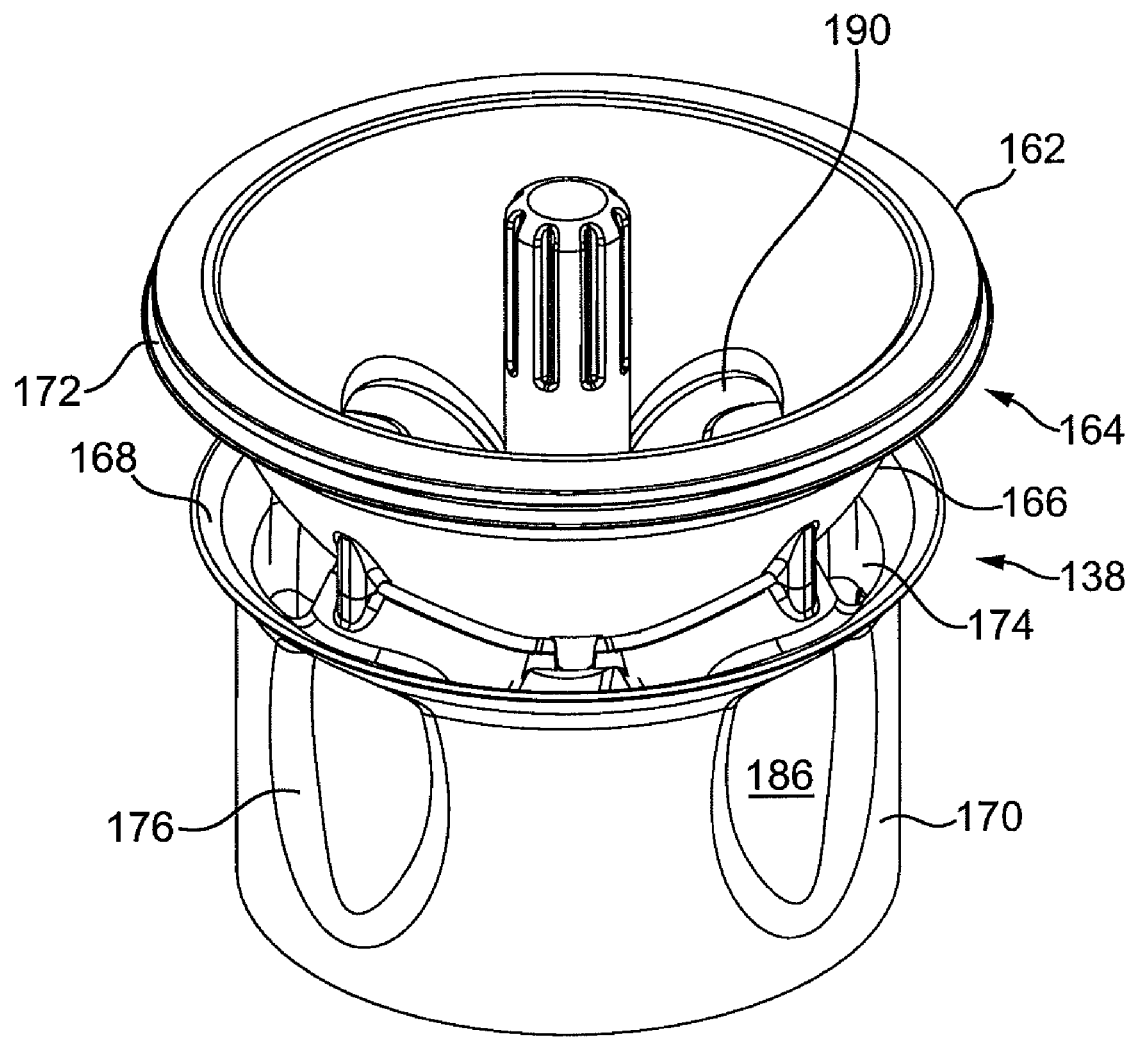

With reference to FIG. 8a the vortex fingers 68 communicate with the cross-over duct assembly 138. The outlet of each vortex finger 68 terminates at the inlet chamber 172 of the cross-over duct assembly 138.

Each filter inlet duct 174 has an inlet opening located towards the upper surface of the cylindrical outer housing 170 and adjacent the inlet chamber 172, and an outlet opening located towards the base of the cylindrical outer housing 170. Each filter inlet duct 174 comprises a passage 184 extending between the inlet opening and the outlet opening. The passage 184 has a smoothly changing cross-section for reducing noise and turbulence in the airflow passing through the cross-over duct 164.

Each filter outlet duct 176 comprises an inlet opening 188 in the outer surface of the cylindrical outer housing 170, and an exit port 190 for ducting cleaned air away from the filter assembly 136. A passage 186 extending between the inlet opening 188 and the exit port 190 passes through the cylindrical outer housing 170 from the outer surface of the cylindrical outer housing 170 towards the axis X. Consequently, the exit port 190 is located closer to the axis X than the outer opening 188. The exit port 190 is preferably circular in shape.

Figure 9A:
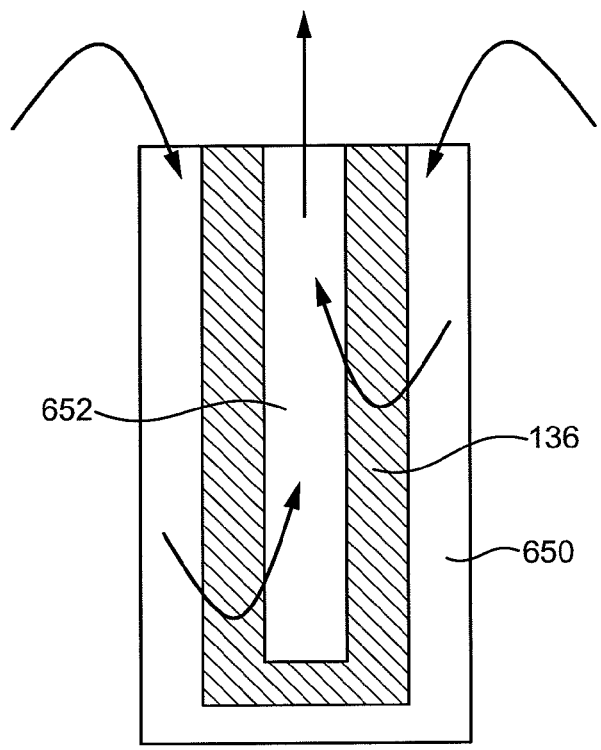
FIG. 9a is an schematic section through a filter according to the present invention.
Figure 9B:
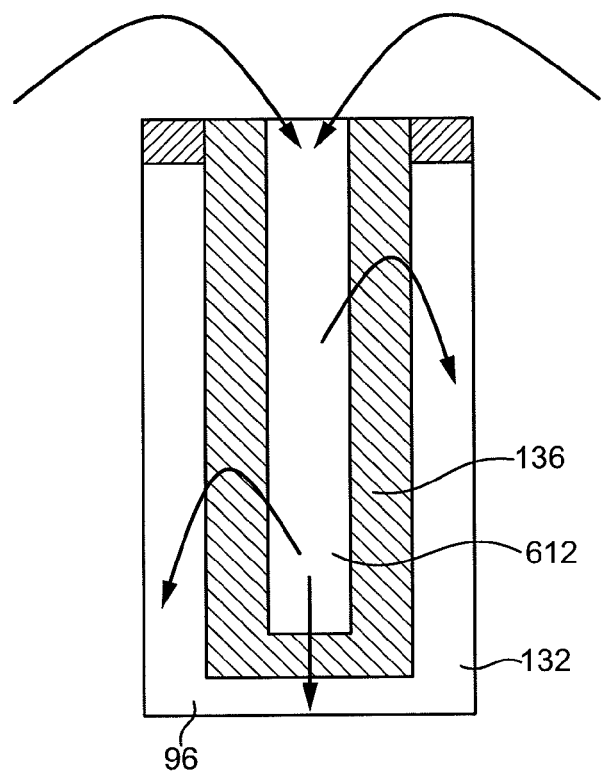
FIG. 9b is a schematic section through a filter according to the present invention.

In FIGS. 9a and 9b alternative arrangements are shown. In these embodiments the first and second cyclonic cleaning stages have been removed. The filters 136 would be positioned in the same position as the filter 136 shown in FIG. 8. However the cross over duct described above would not be required.

In the embodiment shown in FIG. 9a, air traveling from the second cyclonic cleaning stage travels down an outer air pathway 650 which surrounds the filter 136. The air then passes through the filter 136 and then exits the top of the filter 136 via a central exhaust passage 652.

In the embodiment shown in FIG. 9b the air traveling from the second cyclonic cleaning stage passes through the central open chamber 612, and is forced tangentially outwardly towards the filter members of the filter assembly 132. In this embodiment the airflow emitted from the filter 136 passes into the outer cylindrical chamber 132 towards an exit port 96 at the lower end 72 of the separating apparatus.

The invention claimed is:

1. A separating apparatus comprising,
   a first cyclonic cleaning stage,
   a second cyclonic cleaning stage, arranged downstream from the first cyclonic cleaning stage, and
   an elongate filter arranged downstream from the second cyclonic cleaning stage, wherein the filter is at least partially surrounded by the first cyclonic cleaning stage wherein the filter extends from at or near a top edge of the second cyclonic cleaning stage to at or near a base of separating apparatus.

2. A separating apparatus according to claim 1 having a longitudinal axis wherein the longitudinal axis of the filter is in line with the longitudinal axis of the separating apparatus.

3. A separating apparatus according to claim 1 wherein the filter is formed from a plastics material.

4. A separating apparatus according to claim 1 wherein the filter is formed from an organic material.

5. A separating apparatus according to claim 1 wherein the filter is a sock filter.

6. A separating apparatus according to claim 1 wherein the filter is an electrostatic filter.

7. A separating apparatus according to claim 6 wherein the electrostatic filter is connected to a high voltage power supply.

8. A separating apparatus according to claim 7 wherein the high voltage power supply is generated by a printed circuit board located in the separating apparatus.

9. A separating apparatus according to claim 1 wherein the second cyclonic cleaning stage comprises a plurality of secondary cyclones and a dust collecting bin.

10. A separating apparatus according to claim 9 wherein the dust collecting bin of the second cyclonic cleaning stage is surrounded by the first cyclonic cleaning stage.

11. A separating apparatus according to claim 10 wherein the filter is an electrostatic filter which is partially or totally surrounded by the second cyclonic cleaning stage.

12. A separating apparatus according to claim 1 wherein the first cyclonic cleaning stage, the second cyclonic cleaning stage and the filter are arranged concentrically about a common central axis of the separating apparatus.

13. A vacuum cleaner comprising a separating apparatus according to claim 1.

14. A vacuum cleaner according to claim 13 wherein the separating apparatus is removably mounted to a main body of the vacuum cleaner.

* * * * *